May 7, 1929.     A. P. STEINER     1,712,314
WORK REST FOR GRINDING MACHINES
Filed Aug. 2, 1926     2 Sheets-Sheet 2
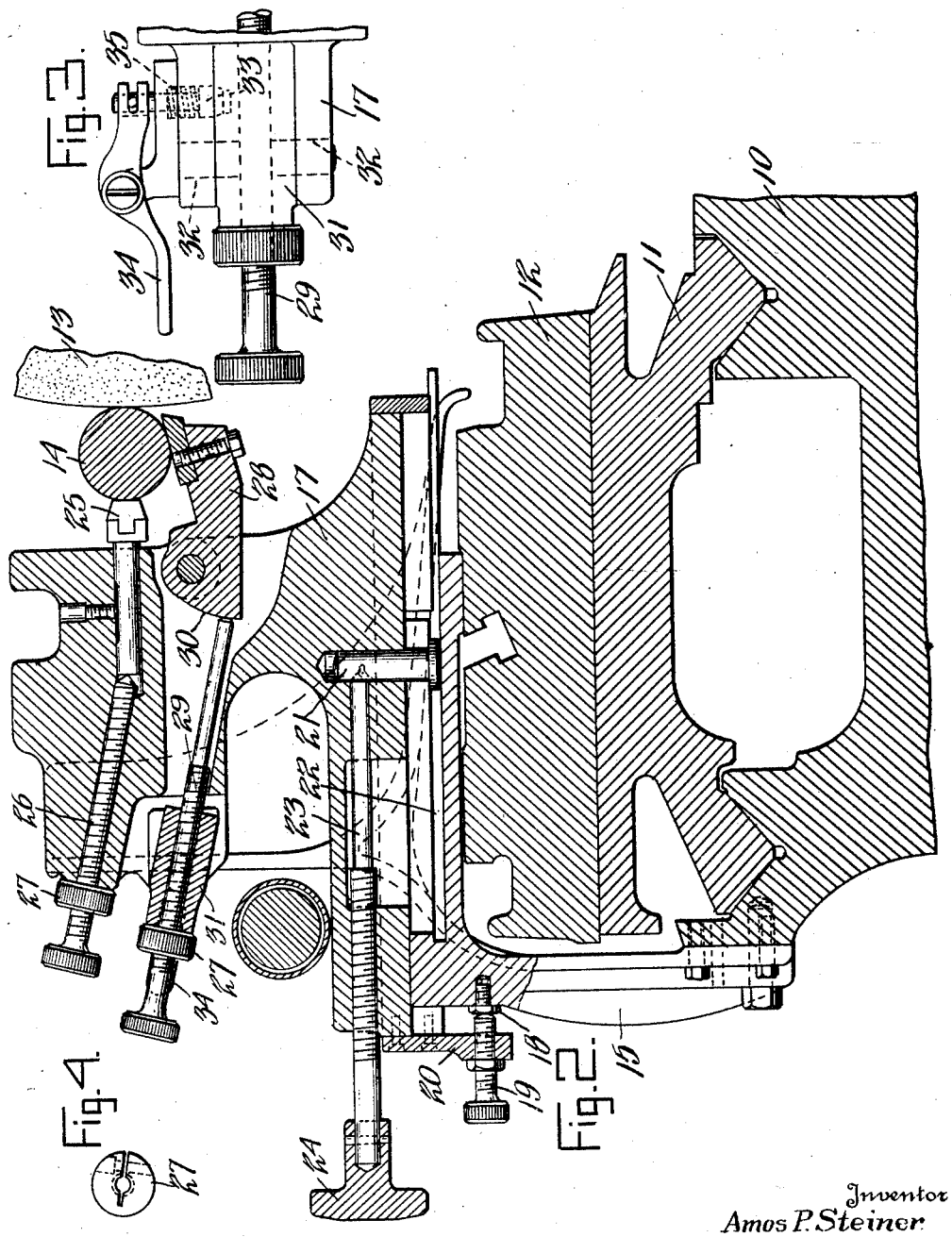
Inventor
Amos P. Steiner
By
Attorney Patented May 7, 1929.

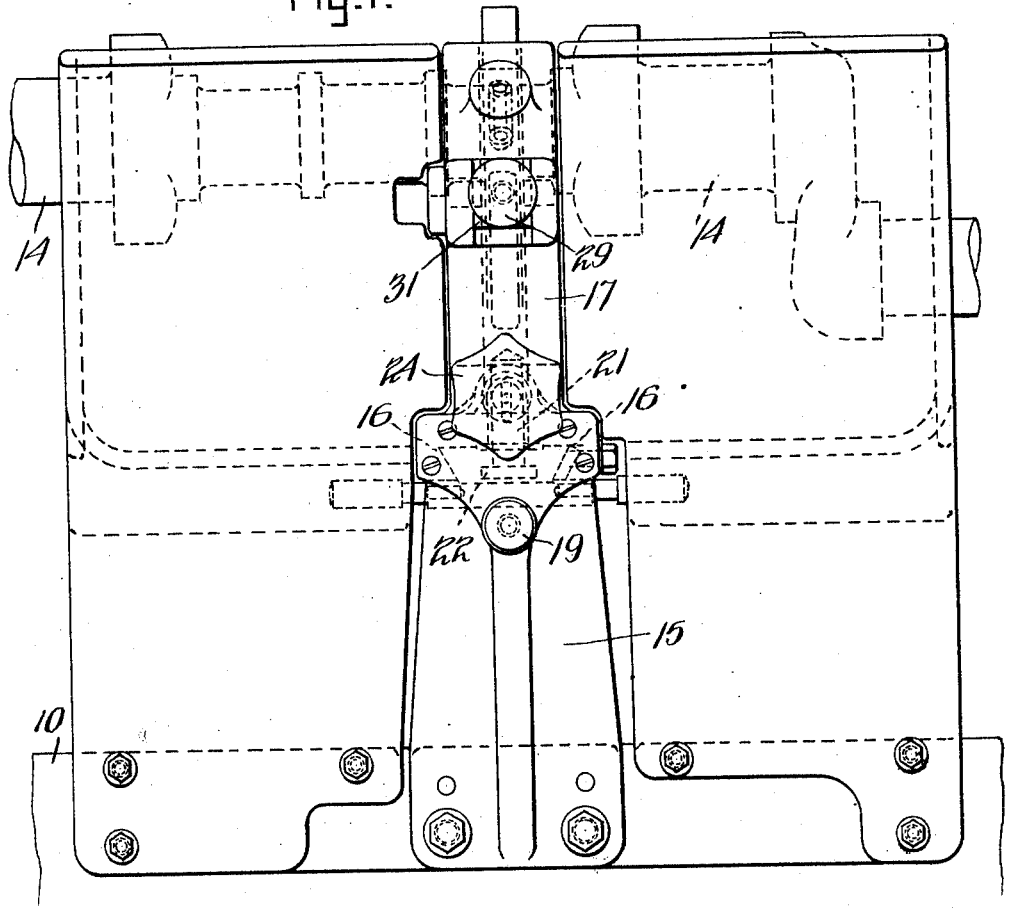

1,712,314

UNITED STATES PATENT OFFICE.

AMOS P. STEINER, OF WAYNESBORO, PENNSYLVANIA, ASSIGNOR TO LANDIS TOOL COMPANY, OF WAYNESBORO, PENNSYLVANIA, A CORPORATION OF PENNSYLVANIA.

WORK REST FOR GRINDING MACHINES.

Application filed August 2, 1926. Serial No. 126,582.

My said invention relates to lathes or grinding machines and more particularly to the work rest or means for supporting the work at points between the spindles to prevent any sagging or distortion due to the pressure of the tool or grinding wheel which is being used. Another object is to provide a device which is adjustable to different sizes of work and also readily adjustable to take up the amount of the cut made by the tool or wheel, thereby keeping the work true at all times.

Referring to the accompanying drawings, which are made a part hereof and on which similar reference characters indicate similar parts, Figure 1 is a front elevation of a work rest, Figure 2, a vertical section therethrough, Figure 3, a detail plan view of the latch for the lower jaw, and Figure 4, a front elevation of one of the adjusting screw nuts.

In the drawings I have illustrated my improved work rest as applied to a grinding machine comprising a bed 10 upon which is slidably mounted the work carriage 11 having mounted thereon a swivel table 12 of a well-known construction. A portion of a grinding wheel is shown at 13 in Figure 2, in contact with the work 14.

The work rest comprises a base 15 secured to the bed 10 and extending upward and rearward over the work carriage 11 and the swivel table 12, said work rest comprising means for supporting the work 14 at a point directly in front of the grinding wheel 13. The base 15 has suitable guides 16 supporting a body 17 which is slidably mounted in said guides so that the work rest may be withdrawn quickly to clear the work when the work carriage is to be traversed for bringing a different portion in front of the grinding wheel.

The base 15 is provided with a hardened stop 18 against which an adjustable stop 19 strikes. The stop 19 is adjustably secured to a bracket 20 fixed to the body 17. The function of the adjustable stop 19 is to permit the adjustable support to be returned accurately to working position after said support has been withdrawn to remove a finished piece of work or for any other reason. A clamping bolt 21 projects upward into the body and has a flattened head formed thereon to engage a T-slot 22 in the base 15. The clamping bolt 21 has a conical indentation at the front side for engagement by a conical point on a clamping screw 23 which has threads engaging threads in the base, and a knob 24 for manual operation whereby the clamping screw engages the clamping bolt and secures the body 17 to the base 15 in any desirable position of adjustment.

The work rest is provided with an upper jaw 25 supporting the work 14 directly from the rear, said jaw being adjustable by a screw 26 carrying a positioning nut 27 for limiting its adjustment. A lower jaw 28 is pivotally mounted on the work rest in position to engage the underside of the work 14. This jaw is adjustable by means of a screw 29 bearing against the curved inclined rear end 30 of the lower jaw. Movement of the adjusting screw 29 is limited by a positioning nut 27 clamped thereon. A nut 31 is pivotally mounted in the body 17 on fulcrum pins 32 (Fig. 3). A spring-pressed detent in the form of a plunger 33 serves to hold the nut 31, screw 29 and the lower jaw in operating position. With this construction of the lower jaw it is possible to drop such jaw quickly away from the work for the purpose of measuring the same with a micrometer or other gaging device. The jaw can then be returned to position by lifting the outer end of the screw 29 so as to force the inner end down the curved incline 30 and move the jaw to working position, all without disturbing the sitting of the adjusting screw 29 or the nut 27.

The plunger 33 which holds the nut 31, screw 29 and the lower jaw in place may be disengaged by depressing the outer end of a lever 34 thereby causing it to lift the plunger. A spring 35 tends to move the plunger back to operative position.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. A work rest of the class described comprising a stationary frame, an adjustable frame carried by said stationary frame, a relatively fixed jaw, a pivoted jaw beneath said fixed jaw, a curved extension on the rear of said pivoted jaw, a pivoted nut mounted in said adjustable frame, an adjusting screw passing through said nut and bearing against said curved extension to swing the pivoted jaw into operative position, and retractable means for holding said nut, substantially as set forth.

2. A work rest of the class described comprising a stationary frame, an adjustable frame carried by said stationary frame, a relatively fixed jaw, a pivoted jaw beneath said fixed jaw, a curved extension on the rear of said pivoted jaw, a pivoted nut mounted in said adjustable frame, an adjusting screw passing through said nut and bearing against said curved extension to swing said pivoted jaw into engagement with the work, means for locking the nut, screw, and pivoted jaw in operative position said locking means being retractable for releasing said nut without altering the adjustment thereof relatively to the screw to permit the swinging of said nut and screw out of contact with the extension and of said pivoted jaw out of contact with the work, substantially as set forth.

3. A work rest of the class described comprising a stationary frame, an adjustable frame carried by said stationary frame, a relatively fixed jaw, a pivoted jaw beneath said fixed jaw, a curved extension on the rear of said pivoted jaw, a pivoted nut mounted in said adjustable frame, an adjusting screw passing through said nut and bearing against said curved extension to swing said pivoted jaw into engagement with the work, means for locking the nut, screw and pivoted jaw in operative position, a lock nut on said screw and bearing against said nut, an aperture in said nut, a spring-pressed plunger in said adjustable frame and adapted to enter said aperture to hold said nut, and a handle to withdraw said plunger, substantially as set forth.

In witness whereof, I have hereunto set my hand at Waynesboro, Pennsylvania this 29th day of July, A. D., nineteen hundred and twenty-six.

AMOS P. STEINER.